(12) United States Patent
Zhang et al.

(10) Patent No.: US 9,013,958 B2
(45) Date of Patent: Apr. 21, 2015

(54) DEVICE FOR POSITIONING SUBMARINE PIPELINE ROBOTS AND METHOD THEREOF

(75) Inventors: Huaguang Zhang, Shenyang (CN); Jinhai Liu, Shenyang (CN); Jian Feng, Shenyang (CN); Jilei Li, Shenyang (CN); Xiangxiang Wei, Shenyang (CN); Da zhong Ma, Shenyang (CN); Zhen wei Liu, Shenyang (CN); Xin gang Zhang, Shenyang (CN)

(73) Assignee: Northeastern University, Shenyang, Liaoning Province (CN)

( * ) Notice: Subject to any disclaimer, the term of this patent is extended or adjusted under 35 U.S.C. 154(b) by 389 days.

(21) Appl. No.: 13/701,763

(22) PCT Filed: Mar. 25, 2011

(86) PCT No.: PCT/CN2011/072164
§ 371 (c)(1),
(2), (4) Date: Dec. 3, 2012

(87) PCT Pub. No.: WO2012/000333
PCT Pub. Date: Jan. 5, 2012

(65) Prior Publication Data
US 2013/0073081 A1 Mar. 21, 2013

(30) Foreign Application Priority Data
Jun. 30, 2010 (CN) .......................... 2010 1 0212901

(51) Int. Cl.
*G01S 15/00* (2006.01)
*G01S 3/80* (2006.01)

(52) U.S. Cl.
CPC .. *G01S 15/00* (2013.01); *G01S 3/80* (2013.01)

(58) Field of Classification Search
CPC ........... G01S 15/00; G01S 3/80; H04B 11/00; G05D 1/02
USPC ...................................... 367/96–134
See application file for complete search history.

(56) References Cited

U.S. PATENT DOCUMENTS

| 5,671,334 A | 9/1997 | Lynne |
| 8,804,461 B2 * | 8/2014 | Imran ........................... 367/134 |

FOREIGN PATENT DOCUMENTS

| CN | 1382997 A | 12/2002 |
| CN | 1601300 A | 3/2005 |
| CN | 1604451 A | 4/2005 |
| CN | 101886743 A | 11/2010 |

* cited by examiner

*Primary Examiner* — Luke Ratcliffe
(74) *Attorney, Agent, or Firm* — Muncy, Geissler, Olds & Lowe, P.C.

(57) ABSTRACT

The present invention relates to a device for positioning submarine pipeline robots and method. The device comprises a pressure wave generator and a device for pressure wave acquiring and processing. The method comprises the following steps of (1) determining the generation mode; (2) acquiring pressure signals; (3) filtering pressure signals; (4) dividing the filtered pressure signals of into the same group; (5) identifying the data during this period in real time; (6) determining the moving state of the robot in the pipeline; (7) calculating the position of the robot in the pipeline; (8) ending the operations, otherwise repeating Step 4 to Step 7 continuously. The present invention has the advantages that the position of submarine pipeline robots can be located in real time. In addition, the severe environment around the pipelines can hardly affect the performance under this method.

4 Claims, 8 Drawing Sheets

DEVICE FOR POSITIONING SUBMARINE PIPELINE ROBOTS AND METHOD THEREOF

BACKGROUND OF THE INVENTION

1. Field of the Invention

The present invention relates to a device for positioning submarine pipeline robots and method thereof, which belongs to the technical field of pipeline detection.

2. The Related Art

Pipelines are widely applied in transportation of petroleum, chemicals, natural gas, etc. and are indispensable. With the development of pipeline industry, pipeline robots are gradually applied to cleaning of pipelines, detection of defects, etc. Accurate positioning of pipeline robots is essential for the robots to complete work. The pipeline robot positioning technique is a technique to position pipeline robots in pipelines. Many methods are used for positioning pipeline robots, and GPS navigation positioning, CCD visual positioning and photoelectric coded disk positioning are widely applied at present.

GPS navigation positioning is a technique that a satellite continuously sends ephemeris parameters and time information of the satellite, and then, the user determines the three-dimensional position, the three-dimensional direction, the moving speed and the time information of the receiver through calculation after receiving the information. GPS can position pipeline robots. However, submarine pipelines are really long and are deeply buried, and the surrounding environment is adverse, so GPS can hardly accomplish navigation positioning.

The charge coupled device (CCD) which is made of photosensitive semiconductor materials can convert light to charges and then to digital signals through the A/D converter chip. After compressed, the digital signals are stored in the flash memory or the built-in hard disk card in the camera, so data can be easily transmitted to computers. However, pipelines have a lot of oil contaminants, so the CCD visual positioning cannot obtain effective visual features.

The photoelectric coded disk is made of optical glass and is engraved with many concentric yards, and each yard has transparent parts and nontransparent parts arranged regularly. In operation, light is projected onto the photoelectric coded disk, and the photoelectric coded disk rotates with the moving object. After passing through the slit, the light penetrating through the bright zone is received by photosensitive elements, wherein the photosensitive elements are arranged correspondingly with the yards. When the photoelectric coded disk rotates in different positions, the combination of output signals from the photosensitive elements shows digital quantity of a certain rule which represents the angular displacement of the axis of the photoelectric coded disk. According to the angular displacement and the diameter of the photoelectric coded disk, the moving distance of the photoelectric coded disk can be calculated to position the pipeline robots. However, oil contaminants in the pipelines also have effects on the photoelectric coded disk, and the photoelectric coded disk cannot position the pipeline robots due to turbulence and slip.

SUMMARY OF THE INVENTION

In terms of the disadvantages of the prior art, the present invention provides a device for positioning submarine pipeline robots and method thereof.

The method is accomplished by using the device for positioning submarine pipeline robots through pressure waves. The device comprises a pressure wave generator and a device for pressure wave acquiring and processing.

The pressure wave generator comprises two booths, pistons, springs, step motors, gears, chains, spring pieces and a single chip microcomputer and driving chip.

All the components of the pressure wave generator are connected as follows: The two cylindrical booths are respectively arranged on both sides of the pressure wave generator and are axially hollow to generate pressure waves to both sides of a pipeline. The two booths are respectively provided with one piston. Four springs are installed uniformly on the outer circumference of each piston (in the direction away from the center of the device), one end of each spring is connected with the outer surface of the piston, the other end of the spring is installed on the end of the booth, and the spring is vertical to the circular cross section of the piston. Each piston is provided with four springs, initial positions of the pistons are adjacent to the outer edges of the booths, and the springs are in the tightening state. The step motors are respectively arranged at the center inside the two pistons, and the gears whose diameters are shorter than those of the booths are installed on the axes of the step motors. Two chains are respectively installed on both ends of any diameter of each gear, one end of each chain is installed at the intersection of the diameter and the circumference of the gear, and the other end of the chain is installed correspondingly at the center inside one piston (in the direction to the center of the device). The spring pieces are installed on side surfaces of the step motors, and the single chip microcomputer and driving chip is installed under the step motors.

The device for pressure wave acquiring and processing comprises pressure transmitters, a signal conditioning board, an A/D module, an ARM processor, FLASH modules and a keyboard display.

The pressure wave generator is installed on the submarine pipeline robot, and the pressure transmitters are respectively installed on the walls at the starting end and the terminal end of the pipeline. The output terminals of the pressure transmitters are respectively connected with the input terminals of the signal conditioning board, the output terminals of the signal conditioning board are respectively connected with the A/D module, the A/D module is connected with the ARM processor, and output terminals of the FLASH modules and the keyboard display are respectively connected with the ARM processor.

The device works in the following principles: The pressure wave generator is installed on the submarine pipeline robot. When the robot is in the pipeline, the pressure wave generator transmits pressure signals respectively to both ends of the pipeline at a constant frequency. The pressure transmitters are respectively installed on both ends of the pipeline to receive the pressure signals from the pressure wave generator. After amplified and filtered by the analog signal conversion module, the pressure signals are transmitted to the microprocessor to process the pressure signals according to the wavelet transformation theory and the data processing technique such as the neural network algorithm. Finally, the positioning distance data of the pipeline robot are calculated according to the distance measurement theory through pressure waves, and then, the data are stored.

The device works in the following procedures: The device is installed on the submarine pipeline robot and moves with the robot in the pipeline. When pressure waves are generated in the specified mode, the single chip microcomputer controls the step motors by the driving chip to enable the gears each having two chains on the step motors to rotate back and forth at a specified frequency. When the step motors rotate forth, the gears engage with the chains tightly, the chains drive the pistons to move inward, and the springs on the outer surfaces of the pistons are in the tensioning state. When the step motors rotate back, the gears disengage with the chains, and the springs on the outer surfaces of the pistons drive the pistons back to the original positions. With the regular back-and-forth rotation of the step motors, the chains are engaged and disengaged regularly, and the pistons do reciprocating motion at a specified frequency in the cavities of the booths. In this way, the device generates pressure waves at a specified frequency to the starting end and the terminal end of the pipeline. To stop generating pressure waves, the single chip microcomputer shuts down the step motors through the driving chip.

Pressure waves can be generated in two modes: (1) Paused generation: The pressure wave generator acquires the speed signal of the pipeline robot. If the speed signal of the pipeline robot is not zero, the device does not generate pressure waves when the robot moves. If the speed signal is zero, the device generates pressure waves at a certain frequency. (2) Real-time generation: The pressure wave generator acquires the speed signal of the pipeline robot. The device generates pressure waves continuously. The frequency of the pressure waves is in inverse proportion to the speed signal of the robot, i.e. the more slowly the robot moves, the higher the frequency of the pressure waves is.

The pressure wave generator should not be too long in practical application but should meet the following conditions: When moving with the robot in the pipeline, the pressure wave generator should not rotate transversely in the pipeline so that the pressure waves can be generated to both ends of the pipeline in the forward direction. In general, preprocessing should be performed before the pressure wave generator is installed, and the appearance of the pressure wave generator should be in the streamline form as much as possible so that the pressure wave generator does not affect the movement of the robot. The pressure wave generator should be inspected before use to make sure that the cavities of the booths are closed, and the pistons move smoothly and do not have problems such as deformation, etc.

The method for positioning submarine pipeline robots through pressure waves comprises the following steps:

Step 1: Acquiring robot moving speed signals by the pressure wave generator, determining the generation mode whether paused generation or real-time generation, and generating pressure signals to the starting end and the terminal end of the submarine pipeline respectively by the pressure wave generator in the specified mode at a constant frequency.

Step 2: Acquiring pressure signals on site by the pressure transmitters (the pressure signals are voltage signals of 1 to 5 V).

Step 3: Eliminating interference and sampling noise by a capacitance-resistance filter, filtering the pressure signals, and performing fine filtering to the filtered pressure signals by non-sampling wavelet filtering to further restore the pressure signals.

Step 4: Dividing the filtered pressure signals of the constant time into the same group as a set of pressure time sequence which is a constant independent of the environment.

Step 5: Identifying the data during this period in real time by the BP neural network.

On-line study of the BP neural network is designed by the following steps of:

1) Determining the embedding delay $\tau$ and the optimal embedding dimension d, and reconstructing the phase space according to the historical time sequence V:

$$X_t = (x_t, x_{t+\tau}, x_{t+2\tau}, \ldots, x_{t+(d-1)\tau})$$

Where: t=1, 2, ... $M_d$, and $M_d$=N−(d−1)$\tau$; $x_t$ represents historical measured pressure signals, $x_{t+x}$ represents other measured signals in a certain time, $M_d$ represents the optimal embedding dimension, and N represents the number of the historical data; $M_d$ d-dimensional vectors fully expand chaotic attractors on the track described in the d-dimensional phase space to restore the dynamic performance of the original system in the sense of topological equivalence.

2) Training the BP neural network with the historical pressure time sequence as a training sample to enable the BP neural network to have the capability of on-line short-term prediction.

3) Combining the real-time data $x_i$ with the historical data to form an input vector as the input of the current neural network in order to obtain the predicted next output $\bar{x}_{i+1}$.

4) Performing real-time training of the BP neural network to the k vectors $X_i, X_{i-1}, \ldots X_{i-k+1}$ including the real-time data $x_i$, and using the obtained weight to update the predicted next weight of the BP neural network in real time.

5) Using $x_i$ and the prediction error (err) of the predicted value $\bar{x}_i$ of $x_i$ as the basis of failure diagnosis; if err>RT, it indicates that the current data include data out of the limits, otherwise continue the failure diagnosis, wherein RT is a preset value or a threshold obtained by automatic identification.

Steps 1) and 2) are completed by the historical pressure time sequence, and Steps 3), 4) and 5) should be performed simultaneously to ensure real-time signal identification.

Step 6: Determining the moving state of the robot in the pipeline according to the identification result of the BP neural network and the frequency of the pressure signals from the pressure wave generator.

Step 7: Calculating the position of the robot in the pipeline according to the distance measurement theory through pressure waves, and updating the data set during this period in real time in terms of the first-in first-out principle.

Step 8: Ending the operations when the robot reaches the end of the pipeline, otherwise repeating Step 4 to Step 7 continuously.

The present invention has the advantages that the function of positioning submarine pipeline robots is realized, and submarine pipeline robots can be positioned in real time by independently acquiring data and completing data analysis and processing. In addition, the severe environment around the pipelines can hardly affect the method.

Figure 1:
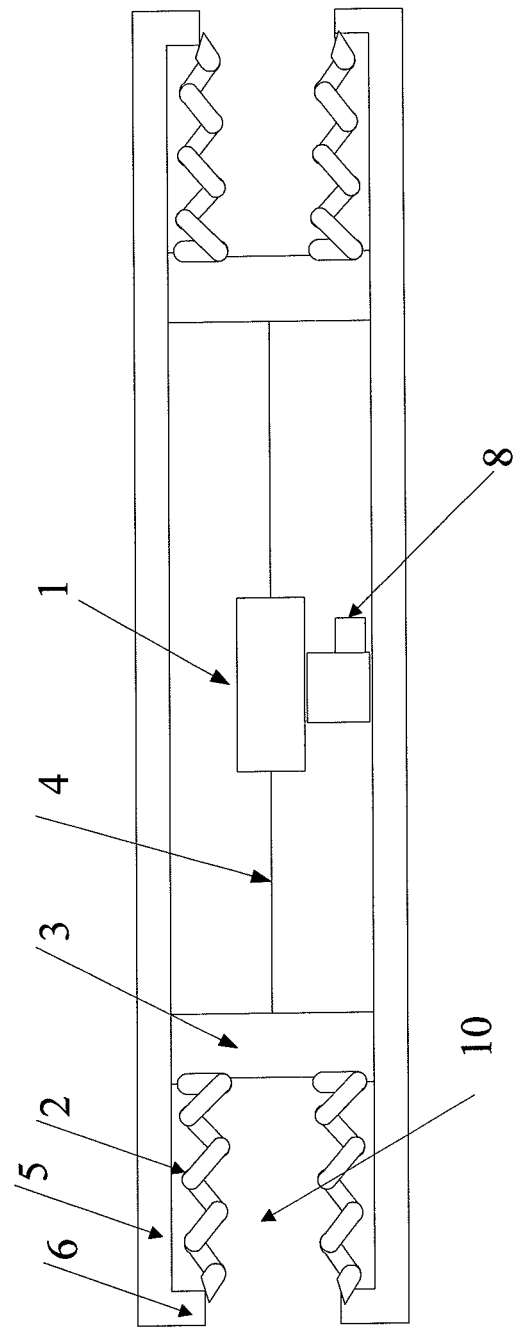
FIG. 1 is the longitudinal section view of the pressure wave generator in the present invention.

In the figures: 1 is the step motor, 2 is the spring, 3 is the piston, 4 is the chain, 5 is the side wall of the booth, 6 is the outer wall of the booth, 7 is the spring piece, 8 is the single chip microcomputer and driving chip, 9 is the gear, and 10 is the booth.

DETAILED DESCRIPTION OF THE PREFERRED EMBODIMENT

The present invention is further described by figures and the embodiment as follows:

The device for positioning submarine pipeline robots through pressure waves comprises a pressure wave generator and a device for pressure wave acquiring and processing.

The pressure wave generator comprises two booths 10, pistons 3, springs 2, step motors 1, gears 9, chains 4, spring pieces 7 and a single chip microcomputer and driving chip 8.

Figure 2:
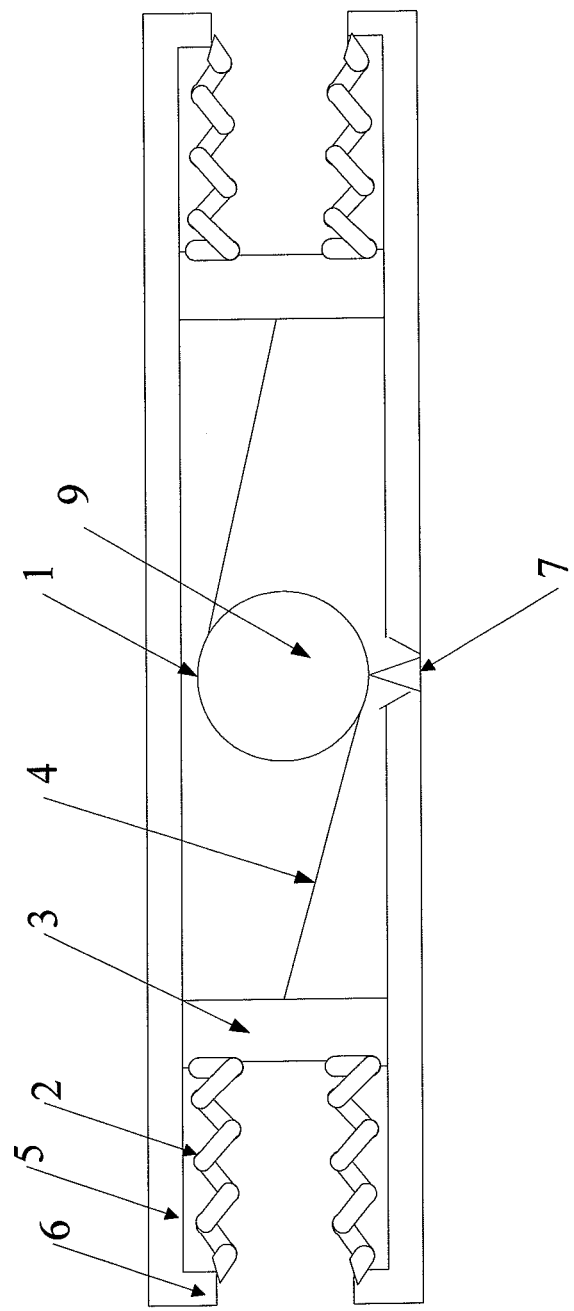
FIG. 2 is the transverse section view of the pressure wave generator in the present invention.
Figure 3:
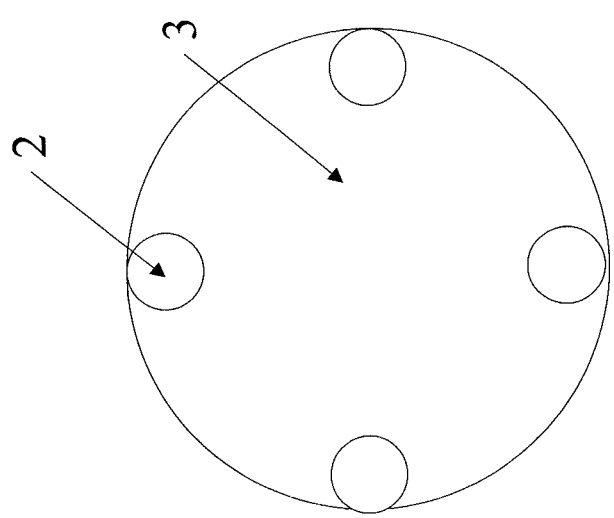
FIG. 3 is the side view of the pressure wave generator in the present invention.
Figure 4:
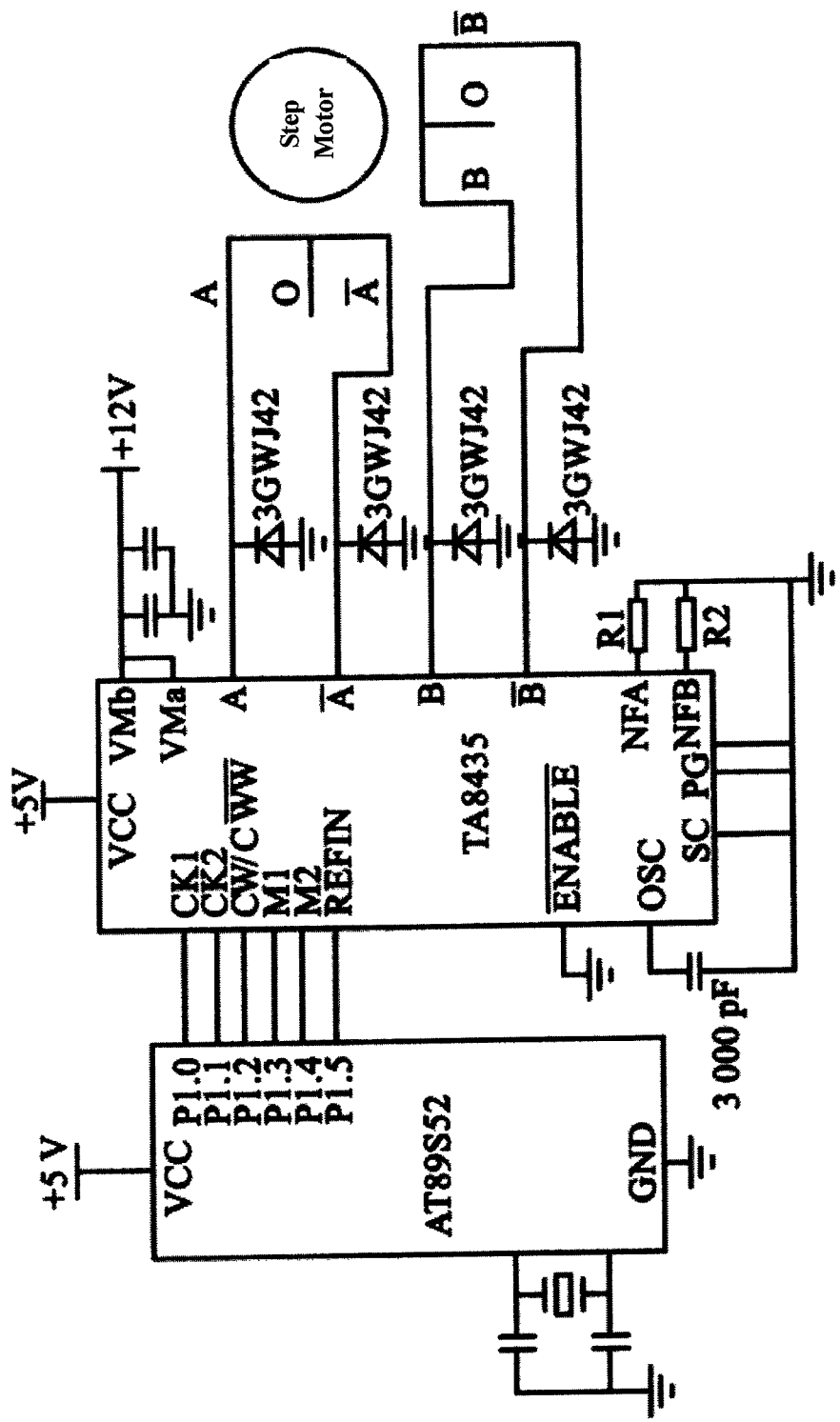
FIG. 4 is the schematic diagram for the single chip microcomputer to control the step motors of the pressure wave generator in the present invention.

All the components of the pressure wave generator are connected as follows: As shown in FIGS. 1, 2 and 3, the two cylindrical booths 10 are respectively arranged on both sides of the pressure wave generator and are axially hollow to generate pressure waves to both sides of a pipeline. The two booths 10 are respectively provided with one piston 3. A spring 2 is installed at every other 90 degrees on the outer circumference of the piston 3 (in the direction away from the center of the device), the other end of the spring 2 is installed on the outer wall 6 of the booth, and the spring 2 enables the spring 7 to be vertical to the circular cross section of the piston 3. Each piston 3 is provided with four springs 2, initial positions of the pistons 3 are adjacent to outer edges of the booths 10, and the springs 2 are in the tightening state. The step motor 1 is arranged at the center of the pressure wave generator, and the gear 9 whose diameter is shorter than those of the booths 10 is installed on the axis of the step motor 1. Two chains 4 are respectively installed on both ends of any diameter of the gear 9, the other end of each chain 4 is installed correspondingly at the center inside one piston 3 (in the direction to the center of the device). The spring pieces 7 which are used to control the step motor 1 to shut down as well as the single chip microcomputer and driving chip 8 which is used to control the step motor 1 are installed in the pressure wave generator, and the single chip microcomputer and driving chip 8 is shown in FIG. 4.

Figure 5:
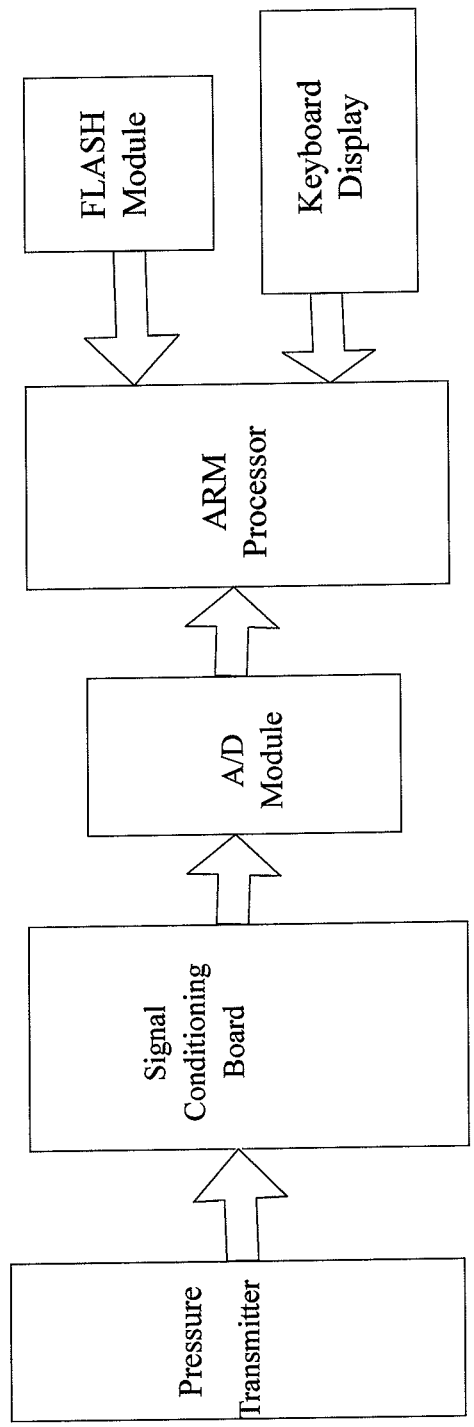
FIG. 5 is the connection diagram of the device for pressure wave acquiring and processing for submarine pipeline robots in the present invention.

The device for pressure wave acquiring and processing is shown in FIG. 5, comprising pressure transmitters, a signal conditioning board, an A/D module, an ARM processor, FLASH modules and a keyboard display. The single chip microcomputer of the pressure wave generator is of the AT89S52 type, and the driving chip is of the TA8435 type. The ARM processor of the device for pressure wave acquiring and processing is of the S3C2440 type.

Figure 6:
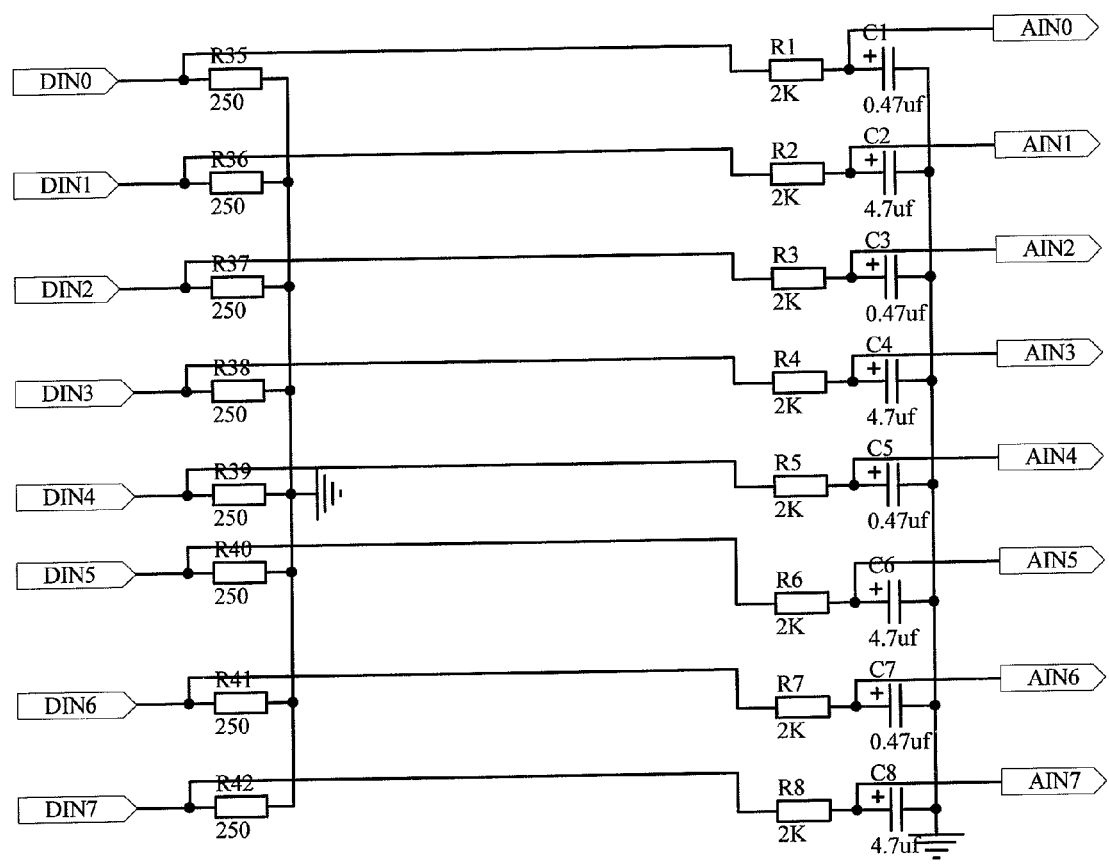
FIG. 6 is the electrical schematic diagram of the signal conditioning board of the device for pressure wave acquiring and processing in the present invention.
Figure 7:
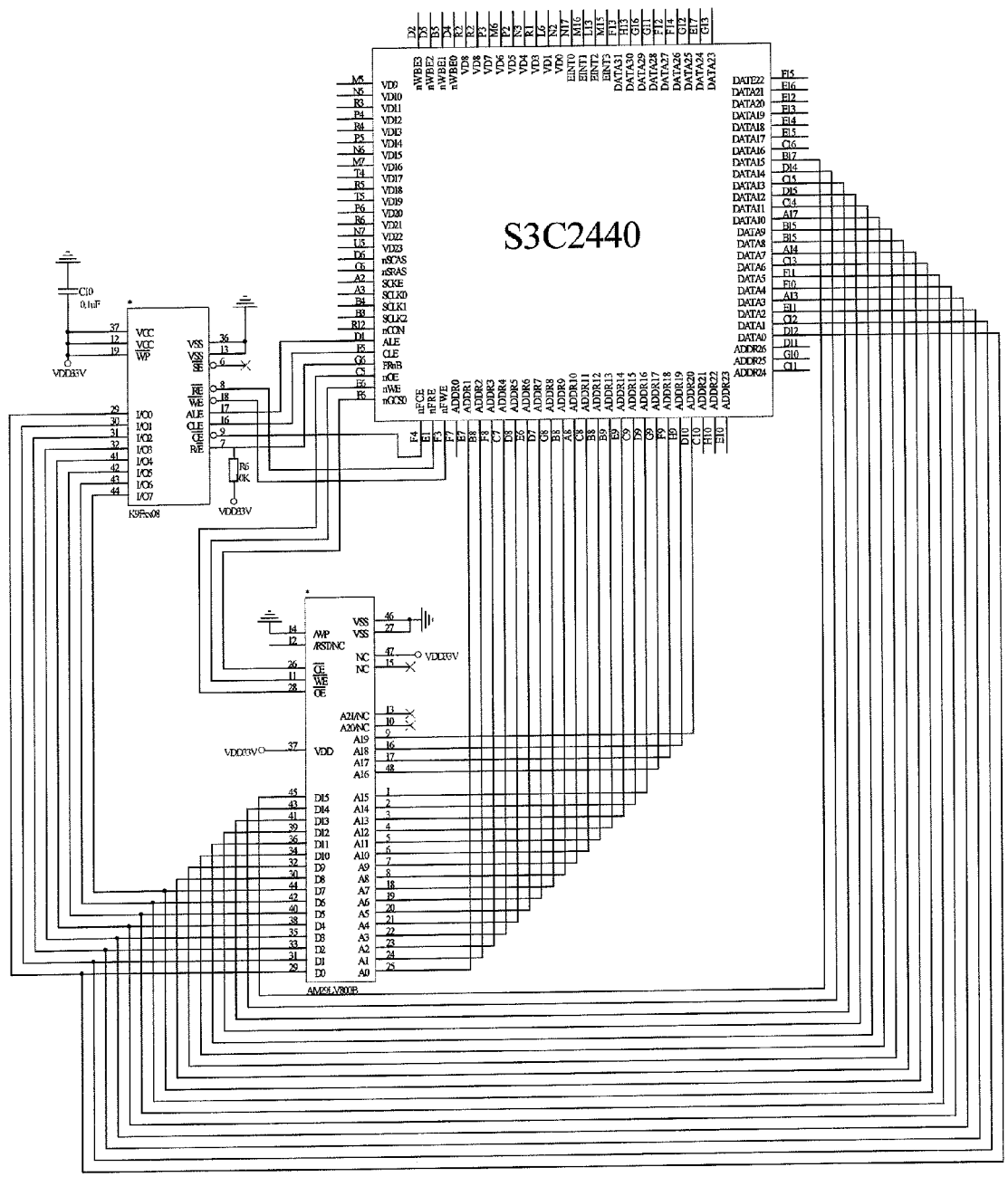
FIG. 7 is the electrical schematic diagram of the FLASH modules and the ARM processor of the device for pressure wave acquiring and processing in the present invention.

The pressure wave generator is installed on the submarine pipeline robot, and the pressure transmitters are respectively installed on the walls at the starting end and the terminal end of the pipeline. The output terminals of the pressure transmitters are respectively connected with the input terminals DIN0 to DIN7 of the signal conditioning board. Pressure signals from the pressure wave generator are acquired on site by the pressure transmitters. The output terminals AIN0 to AIN7 of the signal conditioning board are respectively connected to the input terminals AIN0 to AIN7 of the A/D module built in the ARM processor. After the pressure signals are filtered by the signal conditioning board, and the filtered pressure signals are conditioned to signals acceptable by the A/D module, the A/D module converts the signals to digital signals. Then, the digital signals are transmitted to the ARM processor to process the data. The state of the robot in the pipeline to be detected is determined to position the robot. The interfaces 8, 18, 17, 16, 9 and 7 and the interfaces 29 to 44 of one FLASH module are respectively connected with the interfaces E1, F3, D1, F5, F4 and G6 and the interfaces D12 to A14 of the ARM processor. The interfaces 26, 11, 28, 9, 16, 17 and 48 and the interfaces 1 to 8, 18 to 25 and 29 to 45 of the other FLASH module are respectively connected with the interfaces C5, E6 and F6 and the interfaces D10 to E7 and D12 to B17 of the ARM processor. The output terminals of the keyboard display are respectively connected with the ARM processor. Graphics context information is directly displayed on the keyboard display which is a peripheral of the device. The signal conditioning board is shown in FIG. 6, and connection of the APRM processor and the two FLASH modules is shown in FIG. 7.

The device works in the following procedures: The pressure wave generator is installed on the submarine pipeline robot and moves with the robot in the pipeline. When pressure waves are generated in the specified mode, the single chip microcomputer controls the step motor 1 by the driving chip to enable the gears 9 each having two chains 4 on the step motors to rotate back and forth at a specified frequency. When the step motor 1 rotates forth, the gears 9 engage with the chains 4 tightly, the chains 4 drive the pistons 3 to move inward, and the springs 4 on the outer surfaces of the pistons 3 are in the tensioning state. When the step motor 1 rotates back, the gears 9 disengage with the chains 4, and the springs 4 on the outer surfaces of the pistons 3 drive the pistons 3 back to the original positions. With the regular back-and-forth rotation of the step motor 1, the chains 4 are engaged and disengaged regularly, and the pistons 3 do reciprocating motion at a specified frequency in the cavities of the booths. In this way, the device generates pressure waves at a specified frequency to the starting end and the terminal end of the pipeline. To stop generating pressure waves, the single chip microcomputer stops generating driving pulses. The spring pieces 7 controlled by the single chip microcomputer raise so that the step motor 1 shuts down. The schematic diagram for the single chip microcomputer and driving chip 8 in the device to control the step motors is shown in FIG. 4.

The device works in the following principles: The pressure wave generator is installed on the submarine pipeline robot. When the robot is in the pipeline, the pressure wave generator transmits pressure signals respectively to both ends of the pipeline at a certain frequency. The pressure transmitters are respectively installed on both ends of the pipeline to receive the pressure signals from the pressure wave generator. After amplified and filtered by the analog signal conversion module, the pressure signals are transmitted to the microprocessor to process the pressure signals according to the wavelet transformation theory and the data processing technique such as the neural network algorithm. Finally, the positioning distance data of the pipeline robot are calculated according to the distance measurement theory through pressure waves, and then, the data are stored.

Compared with other methods for positioning submarine pipeline robots, the method in the present invention adopts pressure signals for positioning, which can greatly reduce the effects of the pipeline length and depth to positioning of robots. In addition, the method can hardly be affected by oil contaminants.

Figure 8:
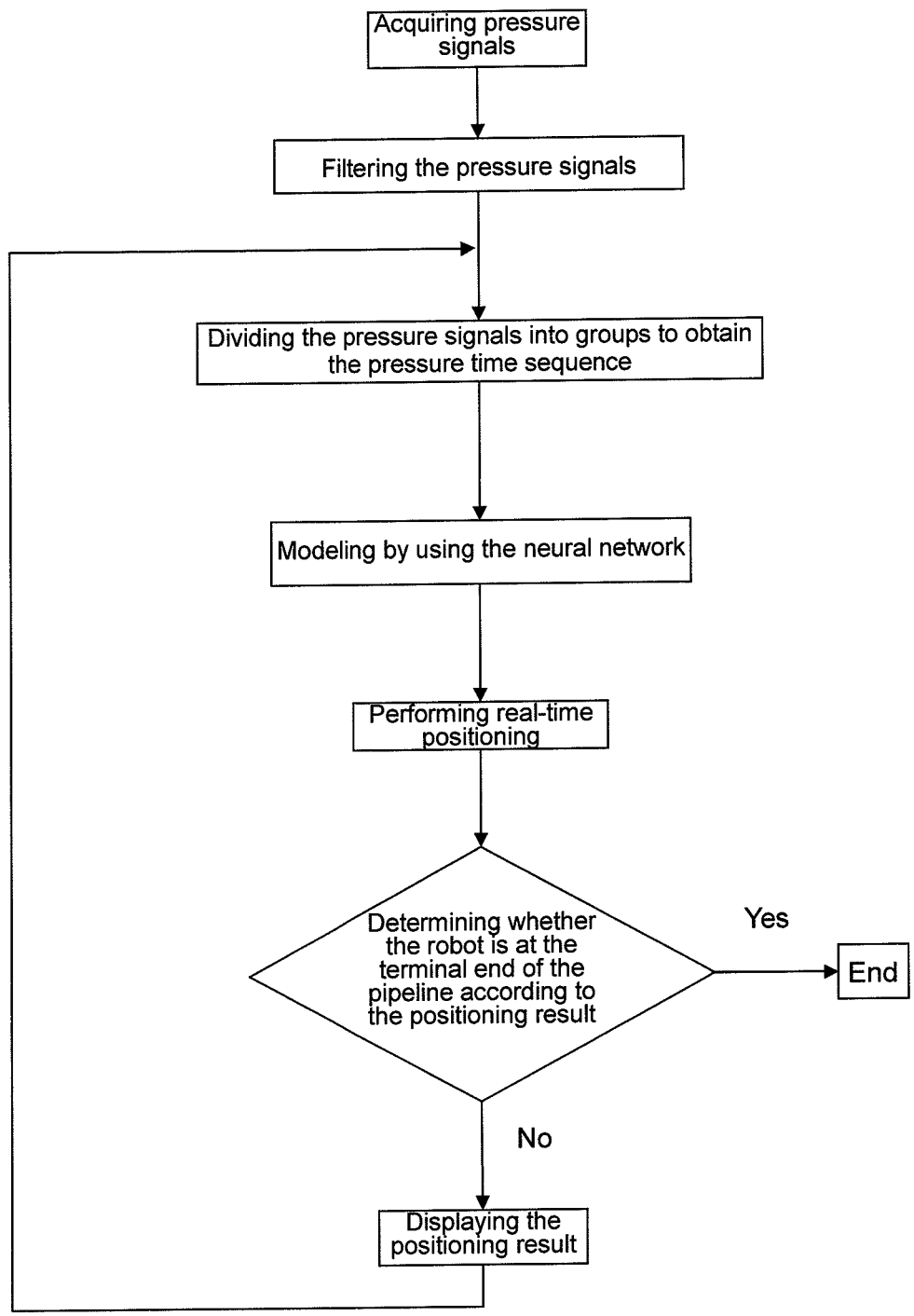
FIG. 8 is the flow chart of the method for positioning submarine pipeline robots through pressure waves in the present invention.

The method for positioning submarine pipeline robots comprises the following steps of: (FIG. 8)

Step 1: Acquiring robot moving speed signals by the pressure wave generator, determining the generation mode whether paused generation or real-time generation, and generating pressure signals to the starting end and the terminal end of the submarine pipeline respectively by the pressure wave generator in the specified mode at the frequency of every 10 seconds.

Step 2: Acquiring pressure signals on site by the pressure transmitters (the pressure signals are voltage signals of 1 to 5 V).

Step 3: Eliminating interference and sampling noise by a capacitance-resistance filter, filtering the pressure signals, and performing fine filtering to the filtered pressure signals by non-sampling wavelet filtering to further restore the pressure signals.

Step 4: Dividing the filtered pressure signals at the frequency of every 10 seconds into the same group as a set of pressure time sequence which is a constant independent of the environment.

Step 5: Performing on-line study in terms of the obtained pipeline pressure time sequence, and identifying the data during this period in real time by the BP neural network.

Step 6: Determining the moving state of the robot in the pipeline according to the identification result of the BP neural network and the frequency of the pressure signals from the pressure wave generator.

Step 7: Calculating the position of the robot in the pipeline according to the distance measurement theory through pressure waves, and updating the data set during this period in real time in terms of the first-in first-out principle.

Step 8: Ending the operations when the robot reaches the end of the pipeline, otherwise repeating Step 4 to Step 7.

Step 5 comprises the following steps of:

1) Determining the embedding delay $\tau$ and the optimal embedding dimension d, and reconstructing the phase space according to the historical time sequence:

$$X_t = (x_t, x_{t+v}, x_{t+2v}, \ldots, x_{t+(d-1)\tau})$$

Where: t=1, 2, ... $M_d$, and $M_d$=N−(d−1)τ; $x_t$ represents historical measured pressure signals, $x_{t+x}$ represents other measured signals in a certain time, $M_d$ represents the optimal embedding dimension, and N represents the number of the historical data; $M_d$ d-dimensional vectors fully expand chaotic attractors on the track described in the d-dimensional phase space to restore the dynamic performance of the original system in the sense of topological equivalence.

2) Training the BP neural network with the historical pressure time sequence as a training sample to enable the BP neural network to have the capability of on-line short-term prediction.

3) Combining the real-time data $x_i$ with the historical data to form an input vector as the input of the current neural network in order to obtain the predicted next output $\bar{x}_{i+1}$.

4) Performing real-time training of the BP neural network to the k vectors $X_i, X_{i-1}, \ldots X_{i-k+1}$ including the real-time data $x_i$, and using the obtained weight to update the predicted next weight of the BP neural network in real time.

5) Using $x_i$ and the prediction error (err) of the predicted value $\bar{x}_i$ of $x_i$ as the basis of failure diagnosis; if err>RT, it indicates that the current data include data out of the limits, otherwise continue the failure diagnosis, wherein RT is a preset value or a threshold obtained by automatic identification.

Steps 1) and 2) are completed by the historical pressure time sequence, and Steps 3), 4) and 5) should be performed simultaneously to ensure real-time signal identification.

What is claimed is:

1. A method for positioning submarine pipeline robots, comprising the steps of:

step 1: acquiring robot moving speed signals by a pressure wave generator, determining a generation mode whether paused generation or real-time generation, and transmitting pressure signals to a starting end and a terminal end of the submarine pipeline respectively by the pressure wave generator in a specified mode at a constant frequency;

step 2: acquiring the pressure signals on site by pressure transmitters, wherein the pressure signals are voltage signals of 1 to 5 V;

step 3: eliminating interference and sampling noise by a capacitance-resistance filter, filtering the pressure signals, and performing fine filtering to the filtered pressure signals by non-sampling wavelet filtering to further restore the pressure signals;

step 4: dividing the filtered pressure signals of a constant time into a group as a set of pressure time sequence which is a constant independent of an environment;

step 5: identifying data during a period in real time by a BP neural network;

step 6: determining a moving state of the robots in a pipeline according to an identification result of the BP neural network and a frequency of the pressure signals from the pressure wave generator;

step 7: calculating the position of the robots in the pipeline according to a distance measurement theory through pressure waves, and updating the data set during the period in real time in terms of a first-in first-out principle; and step 8: ending the operations when the robots reaches the terminal end of the pipeline, otherwise repeating step 4 to step 7 continuously.

2. The method as claimed in claim 1, wherein the step 5 comprises the steps of:

1) determining an embedding delay $\tau$ and an optimal embedding dimension d, and reconstructing a phase space according to a historical time sequence:

$$X_t = (x_t, x_{t+v}, x_{t+2v}, \ldots, x_{t+(d-1)\tau})$$

where: t=1, 2, ... $M_d$, and $M_d$=N−(d−1)τ; $x_t$ represents historical measured pressure signals, $x_{t+x}$ represents other measured signals in a certain time, $M_d$ represents the optimal embedding dimension, and N represents the number of historical data; $M_d$ d-dimensional vectors fully expand chaotic attractors on the track described in a d-dimensional phase space to restore a dynamic performance of an original system in the sense of topological equivalence;

2) training the BP neural network with the historical pressure time sequence as a training sample to enable the BP neural network to have a capability of on-line short-term prediction;

3) combining a real-time data $x_i$ with the historical data to form an input vector as the input of the current neural network in order to obtain a predicted next output $\bar{x}_{i+1}$;

4) performing real-time training of the BP neural network to the k vectors $X_i, X_{i-1}, \ldots X_{i-k+1}$ including the real-time data $x_i$, and using an obtained weight to update a predicted next weight of the BP neural network in real time; and 5) using the real-time data $x_i$ and a prediction error (err) of a predicted value $\bar{x}_i$ of the real-time data $x_i$ as a basis of failure diagnosis; if err>RT, it indicates that the current data include the data exceeding the limits, otherwise continue the failure diagnosis, wherein RT is a preset value or a threshold obtained by automatic identification, wherein steps 1) and 2) are completed by the historical pressure time sequence, and steps 3), 4) and 5) should be performed simultaneously to ensure real-time signal identification.

3. A device for positioning submarine pipeline robots through pressure waves used in the method as claimed in claim 1, comprising:

a pressure wave generator; and a device for pressure wave acquiring and processing, wherein the pressure wave generator comprises two booths, pistons, four springs, step motors, gears, chains, spring pieces and a single chip microcomputer and driving chip, the two booths are respectively arranged on both sides of the pressure wave generator and are axially hollow, and the two booths are respectively provided with one piston, the four springs are installed uniformly on an outer circumference of each piston, one end of each spring is connected with an outer surface of the piston, the other end of the spring is installed on an end of the booth, and the spring is vertical to a circular cross section of the piston, each piston is provided with four springs, initial positions of the pistons are adjacent to outer edges of the booths, and the springs are in a tightening state, the step motors are respectively arranged at a center inside the two pistons, and the gears whose diameters are shorter than those of the booths are installed on axes of the step motors, and two chains are respectively installed on both ends of any diameter of each gear, one end of each chain is installed at an intersection of the diameter and a circumference of the gear, and the other end of the chain is installed correspondingly at a center inside one piston, the spring pieces are installed on side surfaces of the step motors, and the single chip microcomputer and driving chip is installed under the step motors, the device for pressure wave acquiring and processing comprises pressure transmitters, a signal conditioning board, an A/D module, an ARM processor, FLASH modules and a keyboard display, output terminals of the pressure transmitters are respectively connected with input terminals of the signal conditioning board, output terminals of the signal conditioning board are connected with the A/D module, the A/D module is connected with the ARM processor, and output terminals of the FLASH modules and the keyboard display are respectively connected with the ARM processor.

4. The device for positioning submarine pipeline robots through pressure waves as claimed in claim 3, wherein the booths are cylindrical.

\* \* \* \* \*